Figure 1:
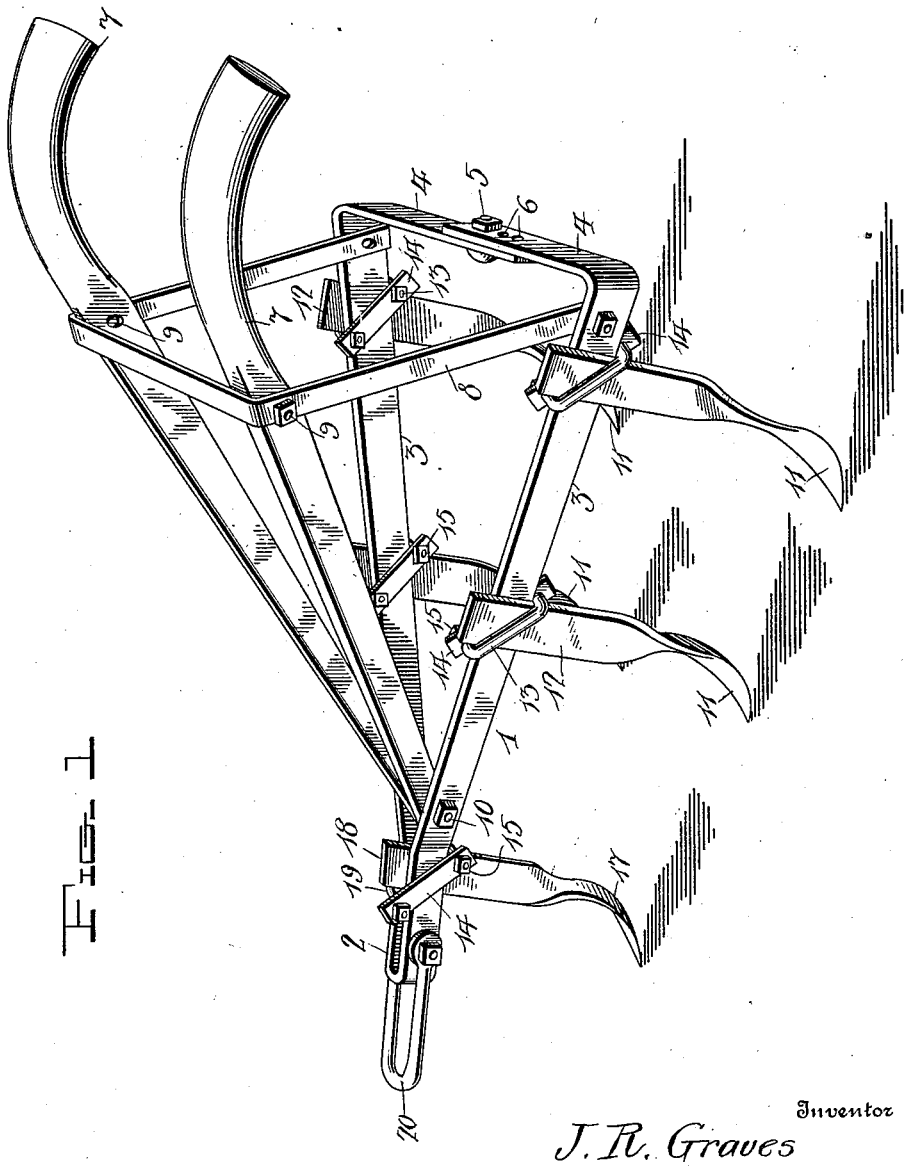

No. 723,380. PATENTED MAR. 24, 1903.
J. R. GRAVES.
CULTIVATOR.
APPLICATION FILED AUG. 15, 1902.

NO MODEL. 2 SHEETS—SHEET 1.

Witnesses

Inventor
J. R. Graves
By H. B. Willson & Co.
Attorneys

No. 723,380. PATENTED MAR. 24, 1903.
J. R. GRAVES.
CULTIVATOR.
APPLICATION FILED AUG. 15, 1902.
NO MODEL. 2 SHEETS—SHEET 2.
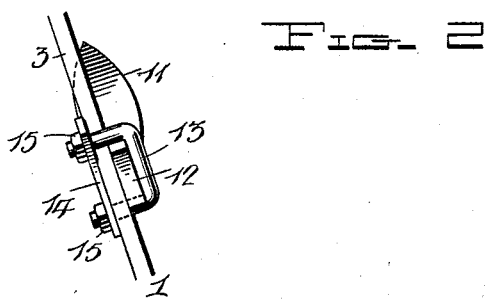
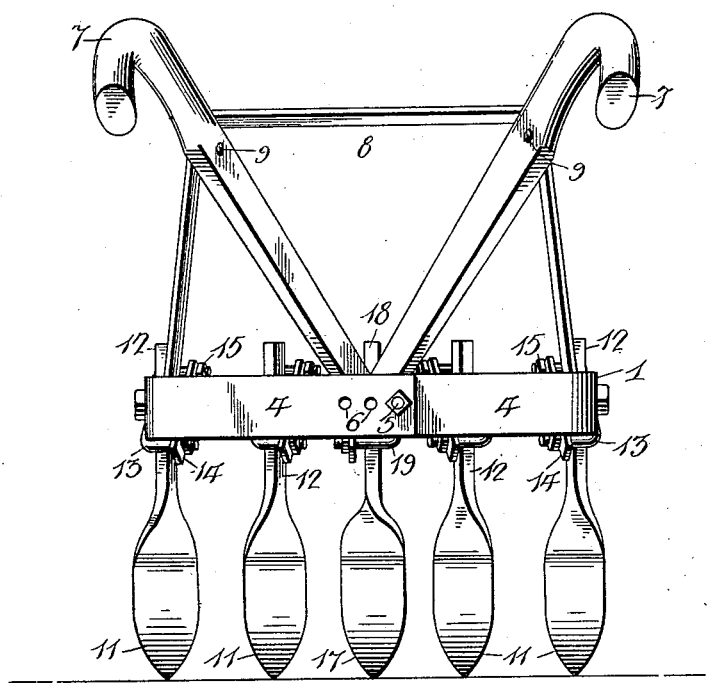

UNITED STATES PATENT OFFICE.

JAMES R. GRAVES, OF FULLER, MISSISSIPPI.

CULTIVATOR.

SPECIFICATION forming part of Letters Patent No. 723,380, dated March 24, 1903.

Application filed August 15, 1902. Serial No. 119,738. (No model.)

*To all whom it may concern:*

Be it known that I, JAMES R. GRAVES, a citizen of the United States, residing at Fuller, in the county of Jones and State of Mississippi, have invented certain new and useful Improvements in Cultivators; and I do declare the following to be a full, clear, and exact description of the invention, such as will enable others skilled in the art to which it appertains to make and use the same.

The invention relates to cultivators.

The object of the invention is to provide a cultivator which shall be simple of construction, durable in use, comparatively inexpensive of production, and one in which the standards of the cultivator may be easily and quickly secured to the beams thereof.

With these objects in view the invention consists in certain novel features of construction, combination, and arrangement of parts, which will be hereinafter fully set forth, and particularly defined in the appended claim.

In the accompanying drawings, Figure 1 is a perspective view of my improved cultivator. Fig. 2 is a top plan view of a fragment of one of the beams, illustrating the manner of connecting the standard of the cultivator to said beam; and Fig. 3 is a rear view of the cultivator.

Referring to the drawings, 1 denotes the beam of the cultivator, which preferably consists of a single piece of strap-iron of proper thickness, bent centrally to form the parallel portions 2, from which point they diverge rearwardly, as shown at 3, and terminate in inwardly-projecting extensions 4, which are connected together by a bolt 5. This connection is an adjustable one and may be effected in any suitable manner, preferably by forming one of the extensions with a horizontal row of apertures 6, whereby the divergent angle of the beams may be increased or lessened to regulate the width of operation of the cultivator.

7 denotes handles secured at their forward ends to the forward ends of the divergent beams and extending rearwardly and connected to the rear ends of the divergent beams by a yoke 8 and by bolts 9 and 10, the former passing through the yoke and handles and the latter through the yoke and rear divergent ends of the beams.

11 denotes the cultivator-shovels, which may be of any suitable shape and construction.

12 denotes the shanks of the cultivator-shovels, which preferably consist each of a flat piece or bar of iron to fit snugly against the sides of the divergent cultivator-beams and are secured thereto by diagonally-extending clips 13, which embrace the beams and the standards and have placed upon their screw-threaded ends tie-bars 14 to prevent the spreading of the ends of the clip and are secured in place by nuts 16.

17 denotes the forward cultivator-shovel, 18 its standard, and 19 a clip of the same construction as those above described and connected to the beam in a similar manner, the only difference in the arrangement being that the standard of said forward cultivator is located between the parallel sides of the beam.

20 denotes a clevis secured to the forward ends of the beam.

From the foregoing description, taken in connection with the accompanying drawings, the construction, operation, and advantages of my invention will be readily understood, it is thought, without requiring a more extended explanation.

Various changes in the form, proportion, and the minor details of construction may be resorted to without departing from the principle or sacrificing any of the advantages of my invention.

Having thus fully described my invention, what I claim as new, and desire to secure by Letters Patent, is—

In a cultivator the combination with the divergent beams, the rear ends of which are provided with inwardly-projecting extensions and the forward ends of which are parallel for a portion of their length and are united, means for adjustably connecting the extensions together, handles secured at their forward ends to the forward ends of said beams, a yoke embracing said handles and secured thereto, the ends of said yoke being secured to the rear ends of said beams, cultivator-shovels connected to the divergent portions of the beams, and a cultivator-shovel, the standard of which projects upwardly between the parallel portions of the beams, a clip straddling the parallel portions of said beams and arranged diagonally to the length of said standard, a tie-bar through which the ends of the clip project, and nuts upon the ends of said clip for drawing the parallel portions of the cultivator-beams securely against the sides of the standard of the cultivator-shovel, for the double purpose of holding said standard in position and preventing the spreading of the cultivator-beams at their forward ends, substantially as described.

In testimony whereof I have hereunto set my hand in presence of two subscribing witnesses.

JAMES R. GRAVES.

Witnesses:
LUTHER HILL,
THOMAS A. HILL.